US010209382B2

(12) United States Patent
McMillan et al.

(10) Patent No.: US 10,209,382 B2
(45) Date of Patent: Feb. 19, 2019

(54) SYSTEM AND METHOD FOR DEPLOYMENT AND RETRIEVAL OF SEISMIC NODES ALONG A CARRIER ROPE

(71) Applicant: SEAFLOOR GEOPHYSICAL SOLUTIONS AS, Lysaker (NO)

(72) Inventors: Ian McMillan, Houston, TX (US); Michael Russell, Villentrois (FR); Thomas Hills, Alicanye (ES); Terje Nalum, Stavern (NO)

(73) Assignee: SEAFLOOR GEOPHYSICAL SOLUTIONS AS, Lysaker (NO)

( * ) Notice: Subject to any disclaimer, the term of this patent is extended or adjusted under 35 U.S.C. 154(b) by 19 days.

(21) Appl. No.: 15/123,689

(22) PCT Filed: Mar. 3, 2015

(86) PCT No.: PCT/NO2015/050046
§ 371 (c)(1),
(2) Date: Sep. 6, 2016

(87) PCT Pub. No.: WO2015/133908
PCT Pub. Date: Sep. 11, 2015

(65) Prior Publication Data
US 2017/0075013 A1  Mar. 16, 2017

(30) Foreign Application Priority Data
Mar. 7, 2014  (NO) .................................. 20140302

(51) Int. Cl.
*G01V 1/38* (2006.01)
*B63B 21/60* (2006.01)
*G01V 1/20* (2006.01)

(52) U.S. Cl.
CPC ............ *G01V 1/3852* (2013.01); *B63B 21/60* (2013.01); *G01V 1/201* (2013.01); *G01V 1/3808* (2013.01)

(58) Field of Classification Search
CPC .... G01V 1/3808; G01V 1/3852; G01V 1/201; B63B 21/60
(Continued)

(56) References Cited

U.S. PATENT DOCUMENTS 4,033,278 A * 7/1977 Waters .................... B63B 21/66
                                                    114/245
4,956,822 A * 9/1990 Barber ................... G01V 1/006
                                                    181/110
(Continued)

FOREIGN PATENT DOCUMENTS

| WO | 2003/096072 | 11/2003 |
| WO | 20121418 | 11/2012 |
| WO | 2014/084741 | 6/2014 |

OTHER PUBLICATIONS

International Search Report issued in PCT/NO2015/050046, dated May 6, 2015, pp. 1-2.
(Continued)

*Primary Examiner* — Daniel L Murphy
(74) *Attorney, Agent, or Firm* — Jeffrey S. Melcher; Manelli Selter PLLC

(57) ABSTRACT

A system (1) for attaching a plurality of seismic nodes (110, 110a) along a main carrier rope (101). The main carrier rope is made of steel or synthetic fiber, and comprises no power or communication lines. The system has a length measuring device (210) for providing a measured length ($L_m$) of deployed main carrier rope (101); a data source (220, 230, 240) for providing positioning data affecting the rope position of each seismic node (110, 110a) on the main carrier rope (101); a control unit (200) for providing an attachment
(Continued)

command whenever the measured length ($L_m$) corresponds to a rope position of a seismic node (110, 110a) computed from the positioning data; and a node attaching unit (100) for attaching a seismic node (110, 110a) to the main carrier rope (101) in response to the attachment command. The system is capable of attaching nodes (110) with different node spacing between some or all nodes along the main carrier rope (101). As the rope positions are determined by the measured length ($L_m$), the system automatically compensates for creep or stretch in the main carrier rope (101). Attaching a seismic node (110) to the main carrier rope (101) at any rope position by means of a clamping device, a suspension device and a fly line is also disclosed.

17 Claims, 5 Drawing Sheets

(58) Field of Classification Search
USPC .......................................................... 367/16
See application file for complete search history.

(56) References Cited

U.S. PATENT DOCUMENTS

| 6,024,344 | A | 2/2000 | Buckley |
| 2005/0052951 | A1 | 3/2005 | Ray |
| 2009/0052277 | A1* | 2/2009 | Swanson ................ G01V 1/201 367/15 |
| 2011/0176383 | A1 | 7/2011 | Jewell |
| 2013/0101355 | A1 | 4/2013 | Thompson |
| 2015/0301212 | A1 | 10/2015 | Gaterman et al. |

OTHER PUBLICATIONS

Written Opinion issued in PCT/NO2015/050046, dated Mar. 6, 2015, pp. 1-6.

* cited by examiner

SYSTEM AND METHOD FOR DEPLOYMENT AND RETRIEVAL OF SEISMIC NODES ALONG A CARRIER ROPE

FIELD OF THE INVENTION

The present invention relates to the general field of marine seismic exploration, and in particular to a system and methods for deployment and retrieval of seafloor seismic nodes.

PRIOR AND RELATED ART

The terms "ocean bottom", "seafloor" and "sea bed" as used herein, all refer to the interface between a geological structure to be surveyed and a water column. Furthermore, terms referring to "ocean", e.g. "ocean bottom cable", are mainly included to comply with common usage on the field, and should not be construed in a limiting manner.

A marine seismic exploration, hereinafter a "survey", is performed by emitting acoustic energy from a source at known locations in space and time and analysing the echoes. For example, a source vessel may tow an array of airguns, fire shots at predetermined intervals and record the location and time for each shot. The acoustic energy released in each shot is sufficiently powerful to penetrate into the rock below the seafloor, and is reflected and refracted by different subterranean layers having different elastic properties. The returned waves or echoes comprise primary waves (P-waves) and secondary waves (S-waves). P-waves are longitudinal pressure waves that can propagate through a fluid and thus can be picked up by hydrophones, for example, by an array of hydrophones towed behind a survey vessel. S-waves are shear waves that do not propagate through a fluid because fluids cannot convey shear forces.

As well known in the art, platforms and other installations in an oil or gas field makes it impossible to tow large streamer assemblies across the field. Thus, seismic nodes deployed on the seafloor have been used to record seismic signals at oilfields and in shallow waters for many years.

In recent years, technical developments in the fields of electronics, data processing, data storage etc. have made it possible to deploy seismic recorders on the seafloor, even at depths greater than 1000 meters, at a reasonable cost. Hence, the use of ocean bottom nodes increases even in areas previously reserved for surface recording of P-waves. The main benefits of using ocean bottom seismic nodes are their improved signal to noise performance compared to towed streamer, their ability to allow unlimited source to receiver geometry flexibility, even in obstructed areas, and their ability to record S-waves, thereby increasing the available information about the subterranean formation. Such a seismic node typically contains a hydrophone to record the pressure wave and geophones, normally 3, to record the velocity waves. For the purposes of the present invention, a seismic node can be assumed to detect and record P-waves and S-waves in three spatial dimensions, allowing an accurate location in space-time for the arrival of any wavelet forming part of a P-wave or an S-wave and any other parameter of interest. The seismic node may optionally perform initial signal processing, such as initial noise reduction, filtering and transformations.

Furthermore, the "seismic node", as the term is used herein, should be assumed to include its own power source, e.g. a battery pack. Using components with low power consumption, e.g. hydrophones, geophones or accelerometers, and solid state memories, and suitable power sources, e.g. Li-ion batteries, current seismic nodes are able to record seismic signals for more than a month, e.g. 45 days, before they are retrieved to a survey vessel for data retrieval, recharging, QC, recalibration and redeployment. Such seismic nodes are also called "autonomous nodes", "seafloor seismic recorders (SSRs)" or "pods" and are generally known in the art. Their internal structures are thus not further described herein.

Ocean bottom seismic nodes can be deployed and retrieved one and one by a remotely operated vehicle (ROV), e.g. in the vicinity of a platform or an underwater installation on a production field. However, if a large array of seismic nodes is to be deployed, the required number of seismic nodes quickly makes such single node deployment and retrieval economically undesirable or impractical.

The present invention relates to an array of seismic nodes regularly deployed, recovered and redeployed etc, on a seafloor, i.e. below a column of water of unspecified depth, for the duration of a survey. The term "deployment period" as used herein refers to the time period in which the array is deployed on the seafloor, typically ranging from a few days to over a month. The term "deployment period" does not refer to the time required to deploy the array.

The array comprises seismic nodes, individually spaced between e.g. 5 to 300 meters apart along lines that may extend for several kilometers or tens of kilometers in a longitudinal direction. The lines are typically deployed a few hundred meters, e.g. 100-400 m, apart in a lateral direction i.e. perpendicular to the longitudinal direction. Traditionally, Ocean Bottom Cables (OBCs) comprising seismic sensors and communication and power lines from the sensors to the surface have been employed, in part to facilitate deployment along an array line and subsequent retrieval. OBCs containing communication and power lines are disclosed, for example, in U.S. Pat. Nos. 4,942,557 and 4,780,863. However, a major shortcoming of such a legacy OBC is that the power requirements and the required shielding for the communication lines etc. makes the OBC rather large, stiff and unwieldy. Another shortcoming is the need for costly pressure tight electro-mechanical connections between the sensors within a housing at the seafloor and communication lines extending to the surface. The cost of these connections tends to increase with increasing depth of deployment. Yet another shortcoming is the reliability of these electro-mechanical connections in the cable, particularly when operated in deep water. Yet another shortcoming is that a cable stretching from the seafloor to the surface may induce motion, vibrations and other noise that disturb the measurements taken by the seismic sensors within the nodes. Yet another shortcoming is the flexibility of the system in regard to inter-sensor spacing, and the limited length of the maximum cable that can be deployed, normally due to power or transmission specifications.

Today, the above shortcomings are alleviated by the use of seismic nodes of the kind briefly discussed above cabled together. The benefits of a cable for deployment and retrieval of a line in a seafloor array are retained by using a steel rope (wire) or a rope made of synthetic fibre or the like when deploying or retrieving the line. This rope is termed "a main carrier rope" in the following description and in the claims, as it merely carries the nodes and does not convey any signals or power. The main carrier rope can be made of any material, e.g. steel or synthetic fibre, provided that it can carry the weight of a predetermined number of seismic nodes during deployment and retrieval of the array line.

As an example, international patent application WO200604143 A1 from Fairfield Industries, Inc. discloses a marine seismic exploration method and system comprised of continuous recording, self-contained ocean bottom pods characterized by low profile casings. An external bumper is provided to promote ocean bottom coupling and prevent fishing net entrapment. Pods are tethered together with flexible, non-rigid, non-conducting cable used to control pod deployment. Pods are deployed and retrieved from a boat deck configured to have a storage system and a handling system to attach pods to cable on-the-fly. The storage system is a juke box configuration of slots wherein individual pods are randomly stored in the slots to permit data extraction, charging, testing and synchronizing without opening the pods. A pod may include an inertial navigation system to determine ocean floor location and a rubidium clock for timing. The system includes mathematical gimballing. The cable may include shear couplings designed to automatically shear apart if a certain level of cable tension is reached.

U.S. Pat. No. 6,024,344 to Buckley et al. (2000) discloses a method for recording seismic data in deep water wherein a plurality of seismic data recorders are attached to a wire stored on a seismic vessel. A free end of the wire is deployed into the water, and the recorders are attached at selected positions along the wire. The wire and recorders are lowered into the water as the vessel moves to control the recorder deployment. The wire controls recorder location and establishes the recorder spacing interval. After the recorders are operated to record seismic data, the wire and attached recorders can be retrieved to the water surface. The recorders can be detached from the wire to facilitate storage and data retrieval from each recorder.

WO 2011139159 A1 from Magseis AS discloses an ocean bottom seismic cable recording apparatus comprising a plurality of seismic node casings separated from each other by separate stress member sections. Each stress member section has an acoustic decoupling arrangement at each end connecting to the seismic node casings. Each seismic node casing comprises an autonomous sensor capsule for sensing and recording seismic data. The autonomous sensor capsule is removable from the seismic node casing and each seismic node casing further comprises an inner compartment accommodating the autonomous sensor capsule.

However, a disadvantage of all present systems is that they have restrictions on the flexibility where seismic detectors can be placed. Different node spacing may be required for a number of reasons. The geophysical requirements will normally dictate this, and different geologies will require different node spacing. Even within a single survey, geology requirements may dictate a different node spacing in different areas of the survey. Additionally seafloor obstructions or variable bathymetry, even within a single receiver line, may cause a requirement to have different node spacings on the main rope in order to achieve a uniform spacing on the seafloor. Clearly, given the above, there can be a requirement for different node spacings from one deployment to the next. Examples of these are shown in FIGS. 1a-b.

OBC systems are built with fixed spacing between the seismic detectors and therefore have basically no flexibility to adjust the spacing between the seismic detectors. They are also limited by the maximum length a cable can have, normally due to power or transmission limitations. Systems using seismic nodes connected together, such as those cited have improved flexibility; however they are still limited in that the main carrier rope needs to be premade, or preconditioned, to the required seismic node spacing. Both U.S. Pat. No. 6,024,344 and WO 2011139159 A1 teach premade "inter-station" cables joined together to make up the main carrier rope. The seismic nodes are connected at the inter-station cable ends. This means that should a different node spacing be required, new inter-station cables need to be made, which is both time and cost prohibitive. Additionally, should inter-station cable length change over time, due e.g. to rope creep, new cables will be required in order to meet the accuracy specifications for the node spacings.

An objective of the present invention is to devise a system that addresses the above limitations and provides for the secure carriage of a recording seismic node where the node and any associated carriage fittings can be attached or detached to or from a stationary or moving main carriage rope with full flexibility in regard to the node position, including variable node spacing. A further objective is that the attachment can be manual or automatic. A still further objective is to provide a system that automatically allows for rope creep or stretching over time without affecting the accuracy of the node spacing. A still further objective is to provide such a system with low costs of manufacture and operation. A still further objective is to provide methods which are fast and efficient and yet reduce any risk of injury to a human operator.

SUMMARY OF THE INVENTION

These and other objectives are attained by a system for attaching seismic nodes to a main carrier rope, a method for attaching seismic nodes to a main carrier rope and a method for detaching seismic nodes from a main carrier rope.

These and other objectives are attained by a system for attaching a plurality of seismic nodes along a main carrier rope comprising:
- a length measuring device for providing a measured length of deployed main carrier rope;
- a data source for providing positioning data affecting the rope position of each seismic node on the main carrier rope;
- a control unit for providing an attachment command whenever the measured length corresponds to a rope position of a seismic node computed from the positioning data; and
- a node attaching unit for attaching a seismic node to the main carrier rope in response to the attachment command, wherein, during deployment:
- each seismic node is attached to a fly line at each of two opposing ends,
- each fly line is connected to a suspension device that is rotatable about the main carrier rope; and
   - two detachable rope clamping devices are affixed to the main carrier rope between the suspension devices such that the seismic node is maintained at a fixed rope position until the rope clamping devices are intentionally released.

These and other objectives are attained by a method for attaching a plurality of seismic node to a main carrier rope on a vessel deploying the nodes, the method comprising the steps of:
a) computing a rope position for each seismic node from geotechnical requirements, topology and other data affecting the position of the seismic nodes on the seafloor;
b) performing a start procedure which includes controlling the vessel position and speed, and deploying a first end of the main carrier rope;
c) maintaining the main carrier rope running at an essentially constant velocity with respect to the vessel;
d) measuring the length of the main carrier rope deployed during the deployment;

e) attaching a seismic node to the main carrier rope whenever the measured length corresponds to a computed rope position for the seismic node;
f) repeating steps d)-e) until a predetermined number of seismic nodes are attached to the main carrier rope; and
g) performing an end procedure which includes deploying a second end of the main carrier rope.

These and other objectives are attained by a method for detaching a plurality of seismic node from a main carrier rope, on a vessel retrieving the nodes, the method comprising the steps of:
a) performing a start procedure which includes retrieving a first end of the main carrier rope and placing a detachment device in an initial position;
b) maintaining the main carrier rope running at an essentially constant velocity with respect to a storage area in a direction toward the storage area during retrieval of the main carrier rope to the storage area;
c) accelerating the detachment device to the velocity of the main carrier rope;
d) detaching a seismic node from the main carrier rope using the detachment device;
e) decelerating the detachment device and the seismic node to a position in the storage area and zero velocity with respect to the storage area;
f) returning the detachment device to the initial position and zero velocity;
g) repeating steps c)-f) until a predetermined number of seismic nodes are detached from the main carrier rope; and
h) performing an end procedure which includes retrieving a second end of the main carrier rope.

In a first aspect, the invention concerns a system for attaching a plurality of seismic nodes along a main carrier rope. The system comprises a length measuring device for providing a measured length of deployed main carrier rope; a data source for providing positioning data affecting the rope position of each seismic node on the main carrier rope; a control unit for providing an attachment command whenever the measured length corresponds to a rope position of a seismic node computed from the positioning data; and a node attaching unit for attaching a seismic node to the main carrier rope in response to the attachment command.

Thus, the system is capable of attaching nodes with different node spacing between some or all nodes along the main carrier rope. As the rope positions are determined by the measured length, the system automatically compensates for creep or stretch in the main carrier rope.

Preferably, the positioning data affecting the rope positions of the seismic nodes comprise geophysical requirements, environmental data and navigational data.

The positioning data comprise ideal positions for the nodes from a geophysical point of view, topological information etc. The rope length required to, for example, pass an obstacle or compensate for ridges and grooves on the seafloor between two desired node locations on the seafloor, and thus the rope positions of the nodes, can be computed from the positioning data.

In a preferred embodiment, each seismic node is attached to the main carrier rope by means of a fly line connecting the seismic node to a suspension device; wherein the suspension device is rotatable about the main carrier rope, and a detachable rope clamping device for maintaining the suspension device at a fixed rope position until the rope clamping device is intentionally released.

Thus, the node attaching unit attaches a clamping device at the desired rope position. The clamping device prevents motion of a suspension device along the rope, and the suspension device allows the node to swivel about the main carrier rope. The swivelling prevents the seismic node and fly lines from entangling with the main carrier rope and thereby ensures proper positioning of the seismic node on the seafloor.

The system can comprise a tool operable by a human operator to connect the node to the main carrier rope. Alternatively, the system can comprise a fully automatic tool operable by the control unit to connect the node to the main carrier rope.

In a preferred embodiment, two fly lines are attached at opposite ends of the seismic node, one fly line at each end. Thereby, the node is kept generally aligned with the main carrier rope, and the node is not lost if one fly line breaks.

Preferably, the rope clamping device comprises two clamping devices separated along the main carrier rope. This allows two spaced apart suspension devices for alignment with the main carrier rope. The node will be attached by one or mode fly lines to the suspension devices at the desired location along the rope.

Preferably, the fly line is detachable from the seismic node. This feature facilitates replacement of the fly line and storage of the node.

In some embodiments, the suspension device is a carabiner clip. This permits fast attachment in both a manual and an automated node attaching unit. A rather large sized carabiner is preferred to avoid problems with sea weed etc. In a manual system, it should be kept in mind that a human operator will wear gloves.

In some embodiments, the rope clamping device comprises a strap configured to press a body radially against the main carrier rope during the deployment period. The strap can be, for example, a steel band or a synthetic webbing that require a tool for attachment and a cutting tool for detachment. The body may be provided with means to enhance friction along the main carrier rope, for example studs or ribs arranged along the circumference along a surface facing the main carrier rope.

In an alternative embodiment, the rope clamping device comprises a cam pinching the main carrier rope during the deployment period.

In another alternative embodiment, the rope clamping device comprises a member that is movable against an inclined surface such that a radial clamping force is exerted against the main carrier rope during the deployment period. In these embodiments, the inclined surface is preferably frustoconical and the member is movable in an axial direction.

In general, any removable clamping device that remains fixed to the main carrier rope during the deployment period, accounting for loads imposed by the attached nodes etc, can be used in the present invention.

In a second aspect, the invention concerns a method for attaching a plurality of seismic node to a main carrier rope on a vessel deploying the nodes. The method comprises the steps of:
a) computing a rope position for each seismic node from geotechnical requirements, topology and other data affecting the position of the seismic nodes on the seafloor;
b) performing a start procedure which includes controlling the vessel position and speed, and deploying a first end of the main carrier rope;
c) maintaining the main carrier rope running at an essentially constant velocity with respect to the vessel;

d) measuring the length of the main carrier rope deployed during the deployment;
e) attaching a seismic node to the main carrier rope whenever the measured length corresponds to a computed rope position for the seismic node;
f) repeating steps d)-e) until a predetermined number of seismic nodes are attached to the main carrier rope; and
g) performing an end procedure which includes deploying a second end of the main carrier rope.

As the method for attaching seismic nodes includes features from the system for attaching seismic nodes discussed above, the method implicitly uses data from various sources to calculate the appropriate rope positions, i.e. different node spacings along the main carrier ropes for some or all pairs of consecutive nodes. Similarly, the method for attaching a plurality of nodes implicitly has the same benefits as the system discussed above, for example automatic compensation for stretch and creep in the main carrier rope.

Further features disclosed in the description of the system can be implemented in the method for attaching seismic nodes. Each feature has an added benefit, and the method can be adapted to include any feature discussed with reference to the system. These features are considered, but are not repeated as steps in the method for simplicity.

In a preferred embodiment, the step of attaching the seismic node involves accelerating an attachment device and the seismic node from an initial position and zero velocity to the velocity of the main carrier rope. It is understood that the acceleration starts at an appropriate point in time: Otherwise, the node would not be attached at the appropriate rope position.

In a further preferred embodiment of the method, accelerating as described in the previous paragraph involves increasing the accelerating force continuously. The opposite would be to apply most of the acceleration in a sudden impulse, which might harm the node or the instruments within. Hence, this feature insures a smooth build-up of the acceleration to avoid adverse effects on the seismic node.

As the main carrier rope is deployed at constant speed, the deployment is fast and convenient. Attaching the rope clamping device and the suspension device of the system above can, for example, be carried out by mounting a suitable attachment tool on a trolley moving parallel to the main carrier rope. With an automated procedure, the operator merely needs to monitor the process, thus avoiding repetitive and otherwise potentially harmful working operations along a running main carrier rope.

In a third aspect, the invention provides a method for detaching a plurality of seismic nodes from a main carrier rope on a vessel retrieving the nodes. The method comprises the steps of:
a) performing a start procedure which includes retrieving a first end of the main carrier rope and placing a detachment device in an initial position;
b) maintaining the main carrier rope running at an essentially constant velocity with respect to a storage area in a direction toward the storage area during retrieval of the main carrier rope to the storage area;
c) accelerating the detachment device to the velocity of the main carrier rope;
d) detaching a seismic node from the main carrier rope using the detachment device; and
e) decelerating the detachment device and the seismic node to a position in the storage area and zero velocity with respect to the storage area;
f) returning the detachment device to the initial position and zero velocity;
g) repeating steps c)-f) until a predetermined number of seismic nodes are detached from the main carrier rope; and
h) performing an end procedure which includes retrieving a second end of the main carrier rope.

During detachment, the seismic nodes are initially attached to the main carrier rope. Hence, the detachment device can be accelerated without regards to any potential harm to the node. It is only necessary to design the detachment device for sudden jolts caused by the acceleration.

However, the deceleration, i.e. negative acceleration, in step e) involves increasing a braking force continuously to avoid harm or damage to the seismic node as discussed above.

Further features and benefits of the invention appear in the dependent claims and the following detailed description.

BRIEF DESCRIPTION OF THE DRAWINGS

The invention will be more fully explained in the following detailed description by way of example and with reference to the accompanying drawings, in which.

DETAILED DESCRIPTION OF PREFERRED EMBODIMENTS

The drawings are schematic and intended to illustrate the principles of the invention. Thus, the elements therein are not necessarily to scale and numerous details known to those skilled in the art are omitted for clarity.

Figure 1A:
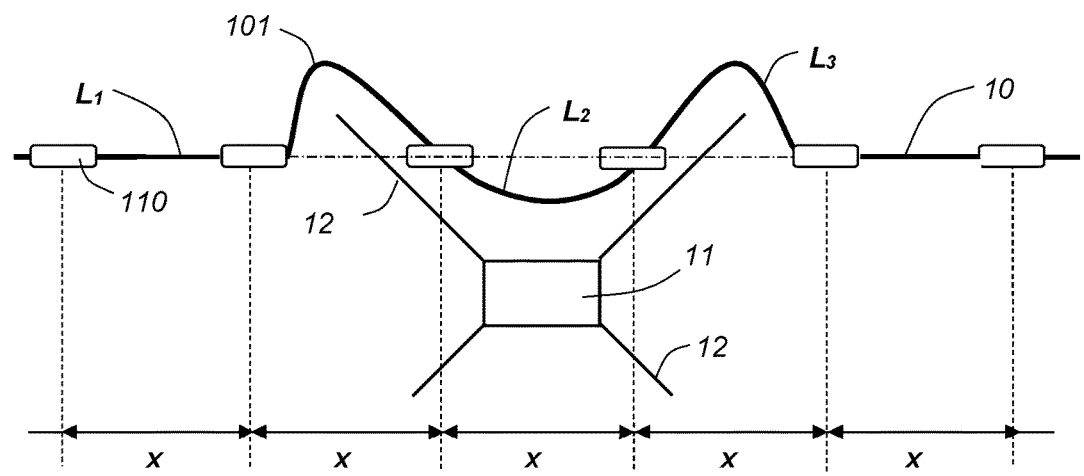
FIG. 1a illustrates variable node spacing around an obstruction.
Figure 1B:
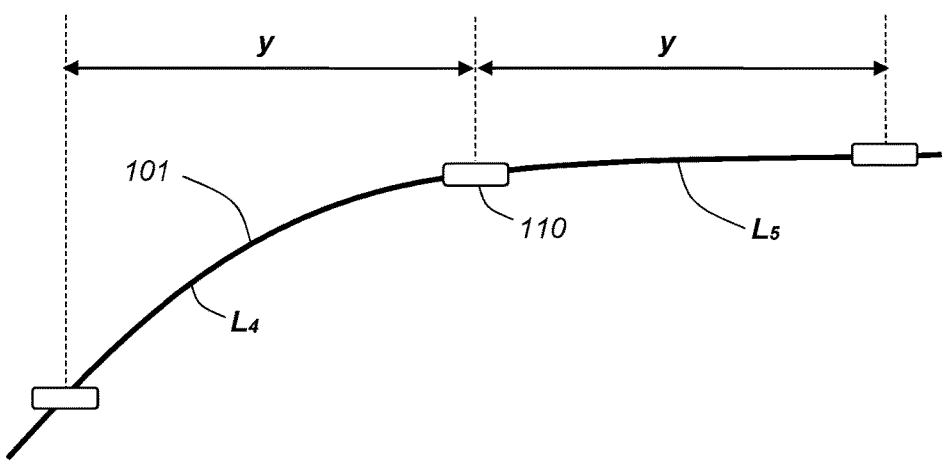
FIG. 1b illustrates variable node spacing due to sea floor profile.

FIGS. 1a and 1b illustrate the context of the present invention. In FIG. 1a nodes 110 are attached to a main carrier rope 101 made of steel or synthetic fibres. The main rope 101 does not contain power lines or communication lines. The nodes 110 are to be deployed along a desired path 10. The path 10 is depicted as a straight line for illustrative purposes, and may have another shape in a real application. The path 10 passes a floating platform 11 kept in position by four anchor lines 12. In FIG. 1a two anchor lines 12 extend past the path 10. The nodes 110 are to be deployed along the path 10 with a fixed distance x between each node. Traditionally, single nodes without any interconnection would be deployed by an ROV. However, the present invention allows variable node spacing along the main carrier rope 101, such that different lengths $L_1$, $L_2$ and $L_3$ of rope can be provided between different pairs of nodes 110. In other words, each seismic node 110 has a unique rope position along the main carrier rope, and these rope positions need not have a constant and equal distance between them. Thus, the nodes 110 can be deployed at their preferred positions along the path 10 independently of their rope positions along the main carrier rope 101. This combines the ability to deploy the nodes 110 at their preferred positions on the seafloor with the convenient retrieval of nodes 110 attached to a main carrier rope.

FIG. 1b illustrates a similar scenario, where the main carrier rope 101 rests on a sloping seafloor. In FIG. 1b, the desired horizontal distance is denoted y to emphasize that the desired distances may vary between different applications, e.g. one depicted in FIG. 1a and another in FIG. 1b. As shown, the desired distance y can be obtained by providing different node spacings $L_4$ and $L_5$ measured along the main carrier rope 101.

Figure 2:
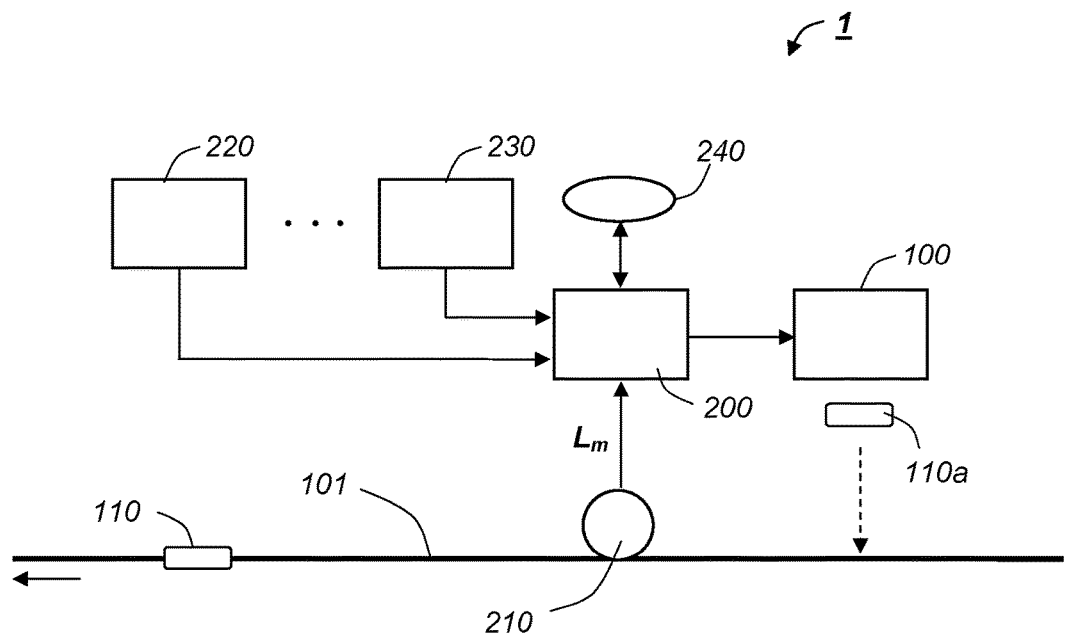
FIG. 2 schematically illustrates a system according to the invention.

FIG. 2 schematically illustrates a system 1 according to the invention. The main carrier rope 101 is shown during deployment. The nodes 110 are to be attached to the rope 101 with variable distances, e.g. the distances $L_1$-$L_5$ in FIGS. 1a and 1b. For this, the system 1 comprises a control unit 200 that compares a measured length $L_m$ with the desired length, e.g. $L_1$, and attaches a new node 110a to the main carrier rope 101 at the appropriate position.

In somewhat greater detail, a length measuring device 210 measures the length $L_m$ along the main carrier rope 101 and provides the measured length $L_m$ to the control unit 200. In addition, a data source represented by boxes 220, 230 and 240 provide input to control unit 200 such that the desired length can be calculated. The data source is schematically illustrated by a survey planning source 220, a source for environmental data 230 and a navigation system 240. The survey planning source 220 illustrates any system or device to obtain, store and provide relevant predetermined data, for example geophysical requirements. The source 230 for environmental data provides current data from the environment in which the node is to be deployed. The environmental data may comprise any data concerning topology, obstructions etc, and can be provided in real time if desired. As used herein, the term "environmental" is not limited to "pollution" or the like, unless such data affect the node spacing illustrated by $L_1$-$L_5$ on FIGS. 1a and 1b. The navigation system 240 provides information on position and velocity that affects the node spacing. Velocity should be construed as a vector comprising speed (magnitude) and direction. The vessel may be a surface vessel or an ROV. Thus, feedback from an ROV deploying nodes near the platform 11 in FIG. 1a can be represented by the navigation system 240.

It is emphasized that the data source shown as separate entities 220, 230 and 240 in FIG. 2 represent any number of sources or systems as illustrated by the dotted line between boxes 210 and 230 in FIG. 2. Furthermore, no fixed boundary between the sources 220, 230 and 240 should be inferred. For example, bathymetry information can be provided by the planning source 220 and/or the source 230 for environmental data. Thus, the data source represented by reference numerals 220, 230 and 240 provide any information that will affect node spacing to the control unit 200.

The control unit 200 uses the information from the data source 220, 230, 240 to calculate the required node spacing, i.e. the desired distance between the node denoted 110 and the next node denoted 110a on FIG. 2. The calculations can be performed before deployment starts, during deployment or both. Once the measured distance $L_m$ corresponds to the desired node spacing, the control unit 200 causes a node attachment unit 100 to attach the next node 110a to the main carrier rope 101.

The node attachment unit 100 can be manual or automatic. In a manual unit, the intended position of node 110a is merely marked on the main carrier rope, e.g. by applying paint or a rope clamping device on the main carrier rope, and the actual attachment of the node 110 is performed by a human operator. In an automatic system, the attachment is preferably performed by a fully automatic attachment device running along the main carrier rope. Similarly, a fully automatic detachment device running along the main carrier rope would preferably be used to detach the nodes 110, 110a etc during retrieval. Regardless of whether the attachment and/or detachment is manual or fully automatic, the main carrier rope, the nodes and their means of attachment are stored in a storage area (not shown) before and after deployments. The storage area may comprise one or more reels for storing the main carrier rope and a system for storing the nodes and other equipment.

Position and motion of a deploying vessel (not shown) can affect the desired node spacing, and the desired node spacing can require changes in position, speed or direction of the deploying vessel, which in some instances can be a surface vessel and in other instances an ROV. The information exchange is represented by a double headed arrow between the control unit 200 and the navigation system 240, which according to the above description may include a ship's navigation and positioning system, a remote control system for an ROV etc.

There are no fixed boundaries between the control system 200 and the data sources 220, 230 and 240, and the schematic illustration in FIG. 2 and description above does not exclude different components, subsystems or arrangements.

Figure 3:
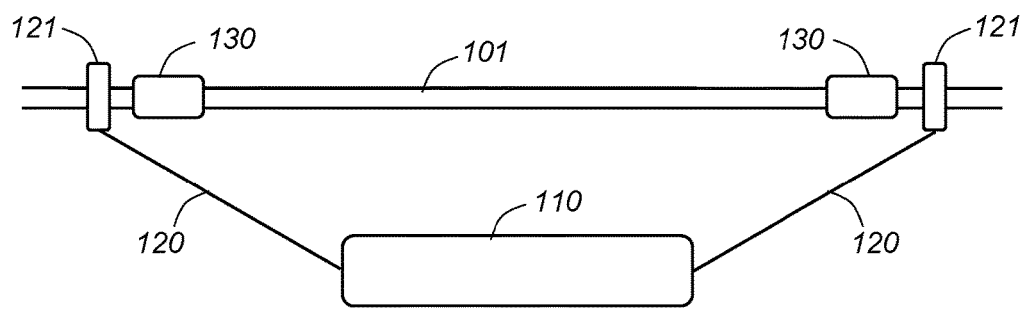
FIG. 3 is a schematic view of a node carrier.

FIG. 3 illustrates how a data recording node 110 is suspended from the main carriage rope 101 in a preferred manner. The main carriage rope 101 is intended to extend longitudinally along the entire length of the ocean bottom seismic array, and has sufficient strength that it does not break when, potentially numerous, seismic nodes 110 are suspended from it during deployment and retrieval. As noted, the main carriage rope 101 contains no signalling or communication lines, so there is no need for protective shielding. Thus, the main carriage rope 101 is easily reeled onto or off winches or rope bins.

The data recording node 110 comprises the seismic sensors, recorder, data storage and power source briefly discussed in the above general part of the description. To avoid damage to the components within the node, the node should not be subjected to extensive sudden jolts or impulses of force during attachment and detachment. In a real implementation, the seismic node 110 has a weight, shape and possibly other means to ensure acoustic contact to the seafloor such that the seismic waves can be detected properly. As shown in FIG. 3, the node 110 is attached to the main carriage rope 101 by two fly lines 120 and two suspension devices 121, one suspension device 121 per fly line 120. However, in some embodiments some or all seismic nodes 110 can be attached by a single fly line per node.

The fly lines 120 are two suspension ropes attached at opposite ends of the node 110, e.g. to fixing points that are built into the node casing. These fly lines 120 serve two purposes, primarily the suspension of the node 110 and secondly to decouple any unwanted noise that might propagate from the main carriage rope 101. To this end they will preferably be of a suitably non-rigid, minimal noise transmission material such as soft fibre rope. The fly lines 120 can be of any suitable length that might assist in a desired longitudinal parallel alignment of the node with the main carriage rope when the two are deployed on the sea floor. The use of two fly lines also provides redundancy. In the case where one fly line breaks off, the node would still be attached to the main carriage rope.

At the opposite end of each fly line 120, a suspension device 121 is attached to provide a connection to the main carriage rope 101. The suspension device 121 represents any suitable device for a simple, fast, and secure connection to the main line 101. It is very important that such a device will be able to freely swivel about the main carrier rope 101 without binding to minimise the risk of the node 110 wrapping around the main carrier rope 101 during deployment from and recovery to the operating vessel.

There may be considerable in transit or sea bed pollution in the form of mud or seaweed etc. Furthermore, for a manual application the suspension device 121 would ideally be oversized so that it could be easily attached to and removed from the main carriage rope 101. It must be considered that an operator will have gloved hands and that the ambient conditions could be both wet and unstable. For both reasons, a relatively large, fast closing snap hook, e.g. a carabiner clip, as the suspension device 121 with an easy opening release would be favoured. The main carriage rope 101 will normally be under considerable tension, and therefore such a simple and fast device will also serve to minimise the operator exposure time. Thus, a relatively large opening carabiner or fast closing suspension device will probably be the most simple and economical solution. There are many such suitable devices to choose from that are readily available on the open market.

The purpose of the rope clamping devices 130 is to keep the seismic node 110 at the appropriate rope position along the main carrier rope 101, i.e. to prevent the suspension devices 121 from sliding along the main carrier rope. The desired separation of the suspension devices 121 in order to align the seismic node 110 with the main carrier rope 101 may be obtained with one (long) clamping device 130 instead of by two separate clamping devices 130 as shown on FIG. 3. Furthermore, other configurations comprising a longitudinally fixed rope clamping device 130 retaining a swivelling rope suspension device 121 are considered. For example, one suspension device 121 attached to two fly lines 120 might be retained at a longitudinal position by two rope clamping devices 130, one at either side of the suspension device. Thus, in accordance with common practice, the terms "a ( . . . ) device" and "the ( . . . ) device" used in the claims should be construed as "at least one ( . . . ) device" and "the at least one ( . . . ) device", respectively. However, the example depicted on FIG. 3 represents a preferred embodiment of the invention.

The rope clamping devices 130 must be easily and quickly attached to or removed from the main carriage rope 101. This can be achieved by many optional designs known to those skilled in the art. However, the preferred embodiment uses two separated rope stoppers 130 with two outside suspension devices 121 connected to fly lines 120 as illustrated in FIG. 3. The actual implementation of the rope clamping devices 130 and suspension devices 121 are less important.

Figure 4A:
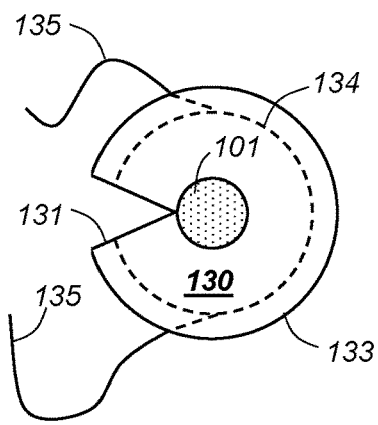
FIG. 4a shows a rope clamping device viewed along the main carriage rope.
Figure 4B:
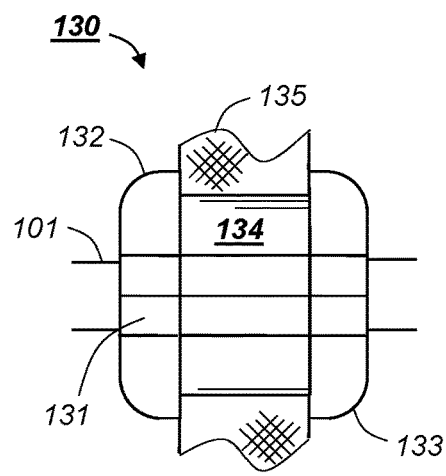
FIG. 4b shows the rope clamping device in FIG. 4a viewed transversely to the main carriage rope.
Figure 4C:
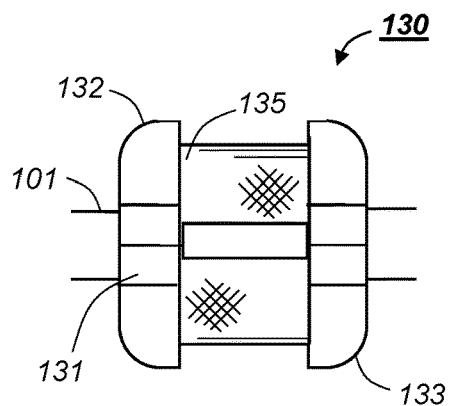
FIG. 4c shows the rope clamping device in FIGS. 4a and 4b during deployment.

FIGS. 4a to 4c illustrate an embodiment of a rope stopper 130 with rotational symmetry, which in use is mounted coaxially on the main carriage rope 101 and is secured in place by a strap 135. Such a simple design lends itself to both manual and automatic application.

In particular, the rope stopper 130 shown on FIGS. 4a to 4c has a guiding opening 131 that extends along the entire length of the stopper 130. Further, the guiding opening 131 has radially inclined faces such that the rope stopper 130 is easily pushed onto the main carriage rope 101 when desired. The stopper 130 also has a mid section 134 with slightly smaller diameter than end sections 132 and 133 to accommodate a securing strap 135, in particular to prevent the strap 135 from sliding off the stopper 130 when the strap 135 is wrapped around the stopper 130 and secured in place.

As the guiding opening 131 in FIGS. 4a and 4b has an inner slit with considerably less width than the diameter of the main carriage rope 101, it is implied that the embodiment on the FIGS. 4a and 4b is elastic to some extent. Thus, in a preferred embodiment the main body of the stopper 130 is made from polyurethane with hardness to suit the application. The strap 135 is preferably corded or woven polyester or stainless steel straps.

For attaching the stoppers 130 to the main carriage line 101, a handheld or automated attachment tool, e.g. a strapping tool, is envisaged. There are both manual and automatic banding machines available on the open market that would suit a fixing method such as the one illustrated in the FIGS. 4a and 4b. Similarly, a handheld or automated detachment tool, e.g. a cutting tool for a strap or band, would be employed to detach the stoppers 130 from the main carriage rope 101. The attachment and detachment tools would of course be chosen or designed depending on the implementation of the stoppers. However, both tools are outside the scope of the present invention and thus not discussed in greater detail herein.

In order to obtain sufficient grip between the stopper 130 and the main carriage rope 101 to suit requirements on linear tension capability it might be necessary to consider more complex designs. These might include improved face friction, locking cams or any other known or purpose designed mechanisms. There are many such alternative designs and solutions that can be considered for this application.

Figure 5A:
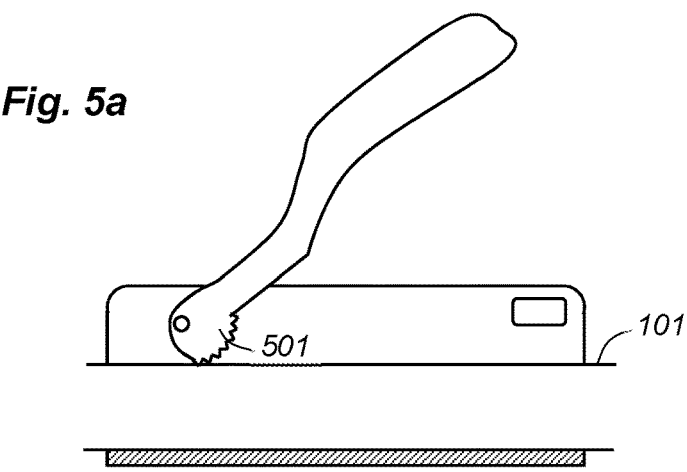
FIG. 5a shows a rope clamping device suitable for manual attachment.
Figure 5B:
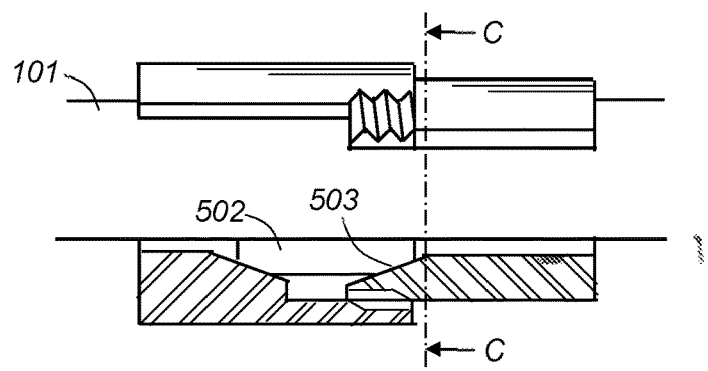
FIG. 5b is a section illustrating inclined faces for converting axial to radial forces.
Figure 5C:
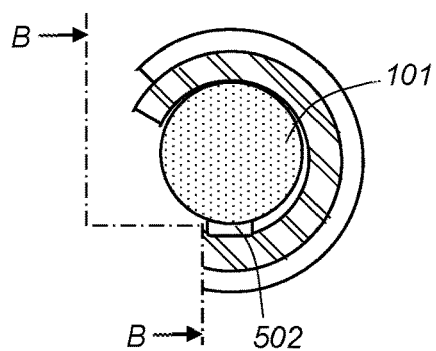
FIG. 5c illustrates a section of the embodiment in FIG. 5b illustrating that rotational symmetry implies frustoconical surfaces rather than inclined planes.

FIGS. 5a to 5c illustrate several such possibilities which are discussed above. FIG. 5a shows a lever with a serrated cam 501 for pinching the main carrier rope 101 during the deployment period. FIG. 5b is a section along planes B-B in FIG. 5c, and shows a member 502 that is movable against an inclined surface 503 such that a radial clamping force is exerted against the main carrier rope 101 during the deployment period. FIG. 5c is a section along plane C-C in FIG. 5b and shows the member 502 clamping the main carrier rope 101. The member 502 may be axially movable on an inclined plane 503. In FIG. 5c, the section along plane C-C has rotational symmetry, and the inclined surface 503 is frustoconical.

The attachment and detachment procedures may be fully automated as set forth in the second and third aspects of the invention, respectively. Main benefits are summarized above. One of the main requirements is to complete these automated procedures without stopping the rope. It is foreseen that to achieve this it will be necessary to incorporate a synchronous traversing machine head or trolley that will accelerate along adjacently to the available length of the operating conveyor belt in order to both synchronise speed with the moving main carriage rope and to create an acceptable motion inertia curve for the node pickup. In particular, the motion inertia curve should be smooth to the third time derivative of motion, i.e. involving a continuous increase of force (acceleration) without steps or sudden jumps in the applied acceleration and braking forces.

Figure 6:
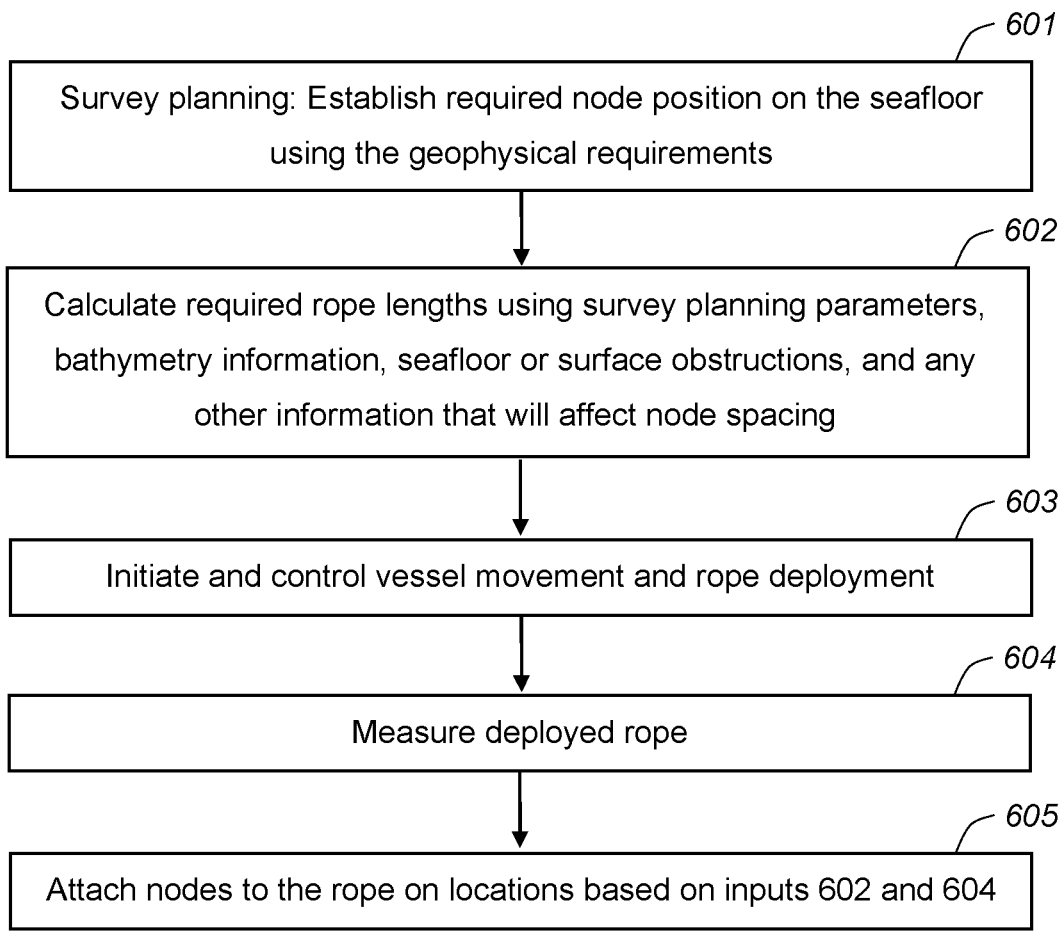
FIG. 6 illustrates a method for attaching nodes to a main carrier rope.

FIG. 6 is a block diagram illustrating main steps of a method according to the invention.

Step 601 is survey planning. This step establishes required node position on the seafloor using the geophysical requirements, and may also include bathymetric or any other relevant data.

Step 602 involves calculating required rope lengths using survey planning parameters, bathymetry information, seafloor or surface obstructions, and any other information that will affect node spacing.

Step 603 includes initiating and controlling vessel movement and rope deployment.

In step 604, the length $L_m$ (FIG. 2) of deployed rope is measured. This step ensures that any shrinking or stretching of the main carrier rope is accounted for.

In step 605, the measured length of rope is compared to the desired node distance, and the nodes 110 are attached to the main carrier rope 101.

Details of the invention described and discussed with reference to FIG. 2 are not repeated here. However, the method is intended to include any variation implied by the system shown in FIG. 2 and described above.

While the invention has been described by way of an exemplary preferred embodiment, the full scope of the invention is set forth in the following claims.

The invention claimed is:

1. A system for attaching a plurality of seismic nodes along a main carrier rope comprising:
    a length measuring device for providing a measured length of deployed main carrier rope;
    a data source for providing positioning data affecting the rope position of each seismic node on the main carrier rope;
    a control unit for providing an attachment command whenever the measured length corresponds to a rope position of a seismic node computed from the positioning data; and
    a node attaching unit for attaching a seismic node to the main carrier rope in response to the attachment command, wherein, during deployment:
    each seismic node is attached to a fly line at each of two opposing ends,
    each fly line is connected to a suspension device that is rotatable about the main carrier rope; and
    two detachable rope clamping devices are affixed to the main carrier rope between the suspension devices such that the seismic node is maintained at a fixed rope position until the rope clamping devices are intentionally released.

2. The system according to claim 1, wherein the positioning data affecting the rope positions of the seismic nodes comprise geophysical requirements, environmental data, and navigational data.

3. The system according to claim 1, further comprising a tool operable by a human operator.

4. The system according to claim 1, further comprising a fully automatic tool operable by the control unit.

5. The system according to claim 1, wherein two fly lines are attached at opposite ends of the seismic node, one fly line at each end.

6. The system according to claim 1, wherein the rope clamping device comprises two clamping devices separated along the main carrier rope.

7. The system according to claim 1, wherein the fly line is detachable from the seismic node.

8. The system according to claim 1, wherein the suspension device is a carabiner clip.

9. The system according to claim 1, wherein the rope clamping device comprises a cam pinching the main carrier rope during the deployment period.

10. A system for attaching a plurality of seismic nodes along a main carrier rope comprising:
    a length measuring device for providing a measured length of deployed main carrier rope;
    a data source for providing positioning data affecting the rope position of each seismic node on the main carrier rope;
    a control unit for providing an attachment command whenever the measured length corresponds to a rope position of a seismic node computed from the positioning data; and
    a node attaching unit for attaching a seismic node to the main carrier rope in response to the attachment command, wherein the rope clamping device comprises a strap configured to press a body radially against the main carrier rope during the deployment period.

11. A system for attaching a plurality of seismic nodes along a main carrier rope comprising:
    a length measuring device for providing a measured length of deployed main carrier rope;
    a data source for providing positioning data affecting the rope position of each seismic node on the main carrier rope;
    a control unit for providing an attachment command whenever the measured length corresponds to a rope position of a seismic node computed from the positioning data; and
    a node attaching unit for attaching a seismic node to the main carrier rope in response to the attachment command, wherein the rope clamping device comprises a member that is movable against an inclined surface such that a radial clamping force is exerted against the main carrier rope during the deployment period.

12. The system according to claim 11, wherein the inclined surface is frustoconical and the member is movable in an axial direction.

13. A method for attaching a plurality of seismic node to a main carrier rope on a vessel deploying the nodes, the method comprising the steps of:
    providing a system comprising a length measuring device for providing a measured length of deployed main carrier rope, a data source for providing positioning data affecting the rope position of each seismic node on the main carrier rope, a control unit for providing an attachment command whenever the measured length corresponds to a rope position of a seismic node computed from the positioning data, and a node attaching unit for attaching the seismic node to the main carrier rope in response to the attachment command;
    a) computing a rope position for each seismic node from geotechnical requirements, topology and other data affecting the position of the seismic nodes on the seafloor;
    b) performing a start procedure which includes controlling the vessel position and speed, and deploying a first end of the main carrier rope;
    c) maintaining the main carrier rope running at an essentially constant velocity with respect to the vessel;
    d) measuring the length of the main carrier rope deployed during the deployment;
    e) attaching a seismic node to the main carrier rope whenever the measured length corresponds to a computed rope position for the seismic node, wherein the seismic node is attached using the node attaching unit, and wherein each seismic node is attached to a fly line at each of two opposing ends, each fly line is connected to a suspension device that is rotatable about the main carrier rope, and two detachable rope clamping devices are affixed to the main carrier rope between the suspension devices such that the seismic node is maintained at a fixed rope position until the rope clamping devices are intentionally released;

f) repeating steps d)-e) until a predetermined number of seismic nodes are attached to the main carrier rope; and g) performing an end procedure which includes deploying a second end of the main carrier rope.

14. The method according to claim 13, wherein attaching the seismic node involves accelerating an attachment device and the seismic node from an initial position and zero velocity to the velocity of the main carrier rope.

15. The method according to claim 14, wherein accelerating involves increasing the accelerating force continuously.

16. A method for detaching a plurality of seismic node from a main carrier rope, on a vessel retrieving the nodes, wherein each seismic node is attached to the main carrier rope as specified in claim 13, the method comprising the steps of:

a) performing a start procedure which includes retrieving a first end of the main carrier rope and placing a detachment device in an initial position;

b) maintaining the main carrier rope running at an essentially constant velocity with respect to a storage area in a direction toward the storage area during retrieval of the main carrier rope to the storage area;

c) accelerating the detachment device to the velocity of the main carrier rope;

d) detaching a seismic node from the main carrier rope using the detachment device;

e) decelerating the detachment device and the seismic node to a position in the storage area and zero velocity with respect to the storage area;

f) returning the detachment device to the initial position and zero velocity;

g) repeating steps c)-f) until a predetermined number of seismic nodes are detached from the main carrier rope; and h) performing an end procedure which includes retrieving a second end of the main carrier rope.

17. The method according to claim 16, wherein the deceleration in step e) involves increasing a braking force continuously.

* * * * *